United States Patent [19]

Makabe et al.

[11] 4,086,862
[45] May 2, 1978

[54] PROGRAMMED ELECTRONIC SEWING MACHINE

[75] Inventors: Hachiro Makabe, Fussa; Kazuo Watanabe; Hideaki Takenoya, both of Hachioji; Toshihide Kakinuma, Tokyo; Toshiaki Kume, Tachikawa, all of Japan

[73] Assignee: Janome Sewing Machine Co., Ltd., Tokyo, Japan

[21] Appl. No.: 715,691

[22] Filed: Aug. 19, 1976

[30] Foreign Application Priority Data

Oct. 17, 1975 Japan .............................. 50-124306

[51] Int. Cl.² .............................................. D05B 3/02
[52] U.S. Cl. ............................ 112/158 E; 112/121.11
[58] Field of Search .......... 112/158 E, 121.11, 121.12; 340/172.5; 318/567, 569; 235/151.11

[56] References Cited

U.S. PATENT DOCUMENTS

| | | | |
|---|---|---|---|
| 3,810,112 | 5/1974 | Aho et al. | 340/172.5 |
| 3,872,808 | 3/1975 | Wurst | 112/158 E |
| 3,970,016 | 7/1976 | Yanikoski | 112/121.12 |

Primary Examiner—Werner H. Schroeder
Assistant Examiner—Peter Nerbun
Attorney, Agent, or Firm—Michael J. Striker

[57] ABSTRACT

An arrangement for forming patterns made up of stitches includes a memory, a stitch-forming apparatus, an addressing device and a synchronizing device. The memory has a plurality of outputs and a plurality of address signal inputs and is comprised of a plurality of storage units connected to the inputs and outputs and addressable by address signals applied to the address signal inputs of the memory. The stitch-forming apparatus has a plurality of stitch control signal inputs connected to outputs of the memory and operative for producing any of a plurality of different stitches in dependence upon the signals produced at the outputs of the memory. The addressing device is operative when activated for applying to the address signal inputs of the memory next-address signals derived from the signals produced at the outputs of the memory itself. The synchronizing device activates the addressing device repeatedly and in synchronism with the operation of the switch-forming apparatus.

11 Claims, 6 Drawing Figures

FIG. 1

FIG_2

FIG.__3

FIG_5

FIG_6

| Stitch | Lateral needle movement | | Feeding movement | |
|---|---|---|---|---|
| | Amount | Code | Amount | Code |
| a | 11 | 01011 | 5 | 01010 |
| b | 19 | 10011 | 10 | 00101 |
| c | 27 | 11011 | 11 | 00100 |
| d | 30 | 11110 | 11 | 00100 |
| e | 29 | 11101 | 11 | 00100 |
| f | 25 | 11001 | 8 | 00111 |
| g | 19 | 10011 | -9 | 11000 |
| h | 22 | 10110 | -9 | 11000 |
| i | 21 | 10101 | -7 | 10110 |
| j | 18 | 10010 | -6 | 10101 |
| k | 12 | 01100 | -7 | 10110 |
| l | 9 | 01001 | -9 | 11000 |
| m | 8 | 01000 | -9 | 11000 |
| n | 11 | 01011 | 8 | 00111 |
| o | 5 | 00101 | 11 | 00100 |
| p | 1 | 00001 | 11 | 00100 |
| q | 0 | 00000 | 11 | 00100 |
| r | 3 | 00011 | 10 | 00101 |

PROGRAMMED ELECTRONIC SEWING MACHINE

BACKGROUND OF THE INVENTION

The present invention relates to programmed sewing machines so designed that any of a plurality of preprogrammed patterns can be selected and automatically reproduced.

Programmed sewing machines of the general type in question are already known. Most commonly, these are provided with mechanical memories, usually made of up pattern cams and cooperating cam followers which form any selected one of a plurality of patterns made up of different combinations of stitches. A disadvantage of such mechanical memories is that they are space-consuming, difficult to fit within the limited confines of the sewing machine frame, and tend to increase the weight of the machine.

It has been proposed to replace these mechanical memories with readable memories having the form of perforated tape or magnetic tape. However, if resort is had to control tapes, then a mechanical drive must be provided for advancing the tape and reading off of it the requisite stitch control signals to be applied to the stitch-forming instrumentalities of the machine.

It is also known to make use of an entirely solid-state preprogrammed transistorized pattern control mechanism for sewing machines. However, these known pattern control mechanism are comprised of sizable storages made up of many storage units which must be read out under the control of counters used for addressing purposes. The use of counters for addressing purposes in this context can be disadvantageous in that the storage of stitch control information in the multi-storage-unit storage must be organized in correspondence to the counting sequence followed by the addressing counter. The possibility of freely arranging the stitch control information contained within the plurality of storage units of the storage does not exist.

SUMMARY OF THE INVENTION

It is a general object of the invention to provide a sewing machine having a pattern control arrangement not possessed of the disadvantages referred to above.

It is a more particular object to provide a sewing machine pattern control arrangement in which the multi-storage-unit memory of the pattern control arrangement not only produces stitch control signals but also the address signals necessary for its own operation.

It is a further object to provide a sewing machine pattern control arrangement in which the multi-storage-unit memory of the pattern control arrangement produces both stitch control signals to be applied to the stitch-forming instrumentalities of the machine and also next-address signals to be applied to the address signal inputs of the memory itself, the application of the next-address signal inputs of the memory proceeding in synchronism with operation of the stitch-forming instrumentalities.

It is a related object to provide a sewing machine pattern control arrangement in which the addressing of the multi-storage-unit memory during reading thereof is not performed under the control of an addressing counter, and in which accordingly the assignment of stitch control information to the individual storage units of the memory need not be limited to a predetermined reading sequence such as that of an addressing counter.

It is likewise a related object to provide such a control arrangement in which the free assignability of the stitch control information to the individual storage units of the memory, in conjunction with the absence of an addressing counter, makes possible many varied pattern programming modifications which can be set up in a simple manner because of the absence of fixed reading sequences such as those which would be established with an addressing counter.

It is another object to provide a pattern control arrangement including a plurality of selectors, one for each pattern to be selected, so designed as to be each activatable for producing either the associated pattern of stitches or alternatively a common pattern, such as straight sewing of plain stitches of a uniform size. Thus, placing a selector into one of its states of activation, would cause a corresponding stitch pattern, for example in the shape of a leaf, to be sewn. Then, placing the same selector in the other of its states of activation, would cause a row of plain stitches to be sewn. This makes for very convenient formation of stitch patterns alternating with plain rows of stitches, or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 6 depicts in tabulated form the correlation between the stitches in one exemplary stitch pattern and the code utilized to represent the individual stitches of the pattern.

DESCRIPTION OF THE PREFERRED EMBODIMENTS

Figure 1:
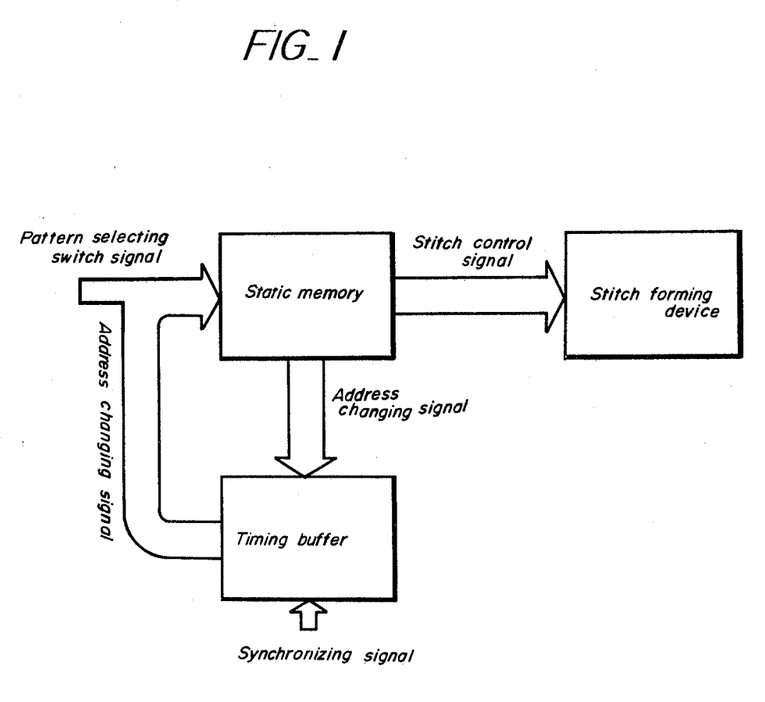
FIG. 1 is a schematic information flow diagram graphically depicting certain important aspects of the information flow in exemplary ones of the electronic sewing machines of the present invention.

FIG. 1 depicts certain important aspects of the flow of information in the illustrated exemplary embodiments of the stitch pattern control arrangement of the novel sewing machine. The control arrangement as depicted is comprised of pattern selecting switches which generate signals which are applied, as address signals, to a static memory. The application of the first group of address signals causes the static memory to produce at a first set of outputs stitch control signals and at a second set of outputs next-address signals. The stitch control signals are applied to a stitch forming device which forms a corresponding stitch, for example a stitch of a corresponding length extending in a corresponding direction. The next-address signals are applied to a timing buffer which connects the next-address signal outputs of the static memory to the address signal inputs thereof. After the first group of address signals has been applied to the static memory by the pattern selecting switches, the address signals for the memory are the next-address signals, or address changing signals, being produced at the next-address signal outputs of the memory. The application of such next-address signals, or address changing signals, to the address signal inputs of the memory is effected in synchronism with the operation of the stitch forming device, for example, in synchronism with the rotation of the upper shaft of the sewing machine. This synchronization is effected for example by enabling the timing buffer in synchronism with operation of the stitch forming device.

The first set of next-address (address changing) signals is generated in response to application of the first set of address signals to the address signal inputs of the memory. In turn, the use of the first set of next-address signals as the second set of address signals leads to the generation of the second set of next-address signals, which are in turn utilized as the third set of address signals. The utilization of any of the thusly generated sets of next-address signals does not occur in immediate response to generation of the set of next-address signals; instead, the next-address signals are merely applied to the timing buffer which passes them on to the actual address signal inputs of the memory only when the information transfer moment, synchronized with operation of the stitch forming device, is next reached.

When the last stitch in the pattern comes up, the last group of stitch control signals at the stitch control signal outputs of the memory will be accompanied by the last group of next-address signals at the next-address signal outputs of the memory. This last group of next-address control signals will be the same as the first group of address signals applied to the address signals of the memory. As a result, the pattern will be sewn again. The pattern is sewn repeatedly in this way.

Once the stitch control signals for the first stitch are produced, in response to the application of the first set of address signals by activation of one of the pattern selectors, there is no need for continued activation of the pattern selector; instead, the pattern can be repeated for as long as synchronizing signals continue to be received, for example until the power to the prime mover of the sewing machine is interrupted by release of the foot pedal, or the like, whereafter patterned sewing will occur only in response to renewed activation of one of the pattern selectors.

According to a further concept of the invention, described in considerable detail below, it is not necessary to generate at the outputs of the memory stitch control signals and distinct therefrom the next-address signals. Instead, the next-address signals can be derived from the stitch control signals, or the stitch control signals can be utilized without modification as the next-address signals themselves, in addition to their use as stitch control signals.

The invention is particularly advantageous in the freedom with which the memory of the stitch pattern control arrangement can be programmed. Because the arrangement does not make use of addressing counters or other such means for establishing fixed sequences for the reading of the individual multi-bit storage units of the memory, the individual storage units of the memory can be read out in any order desired. Each multi-bit storage unit associated with a particular pattern contains information indicative of and determinative of the next storage unit to be read. For example, if the memory consists of sixty-four multi-bit storage units, it would be possible to read storage units #1, #5, #29, #2, #31, in that order, without any disruption of the other patterning schemes.

This is in marked contrast to what would be the case if addressing counters or the like were utilized to select the next storage unit to be read.

The importance of this feature lies in the storage of patterns containing different numbers of stitches, and most particularly in the storage of many patterns which are changed from time to time.

For example, the assignment of storage units for two or three patterns may initially be very orderly, with the information for successive stitches of one pattern being registered in successively numbered storage units, and with those of the next pattern being arranged in the immediately following group of successively numbered storage units. However, as patterns are removed and replaced by other patterns involving other numbers of stitches, "gaps" in the orderly distribution of information to the storage units may arise, so that for example isolated individual storage units may be unused. If subsequently it is desired to write in a further stitch pattern consisting for example of ten stitches, it is not necessary that the required number of storage units be available in numerical succession. Instead, use could be made of the isolated storage units, if a sufficient number of them are available. This makes it unnecessary to reprogram the entire memory, which might be a very sizable memory, or to rewire addressing counters, or in any other way disturb the patterning schemes established for the other patterns memorized in the static memory.

Figure 2:
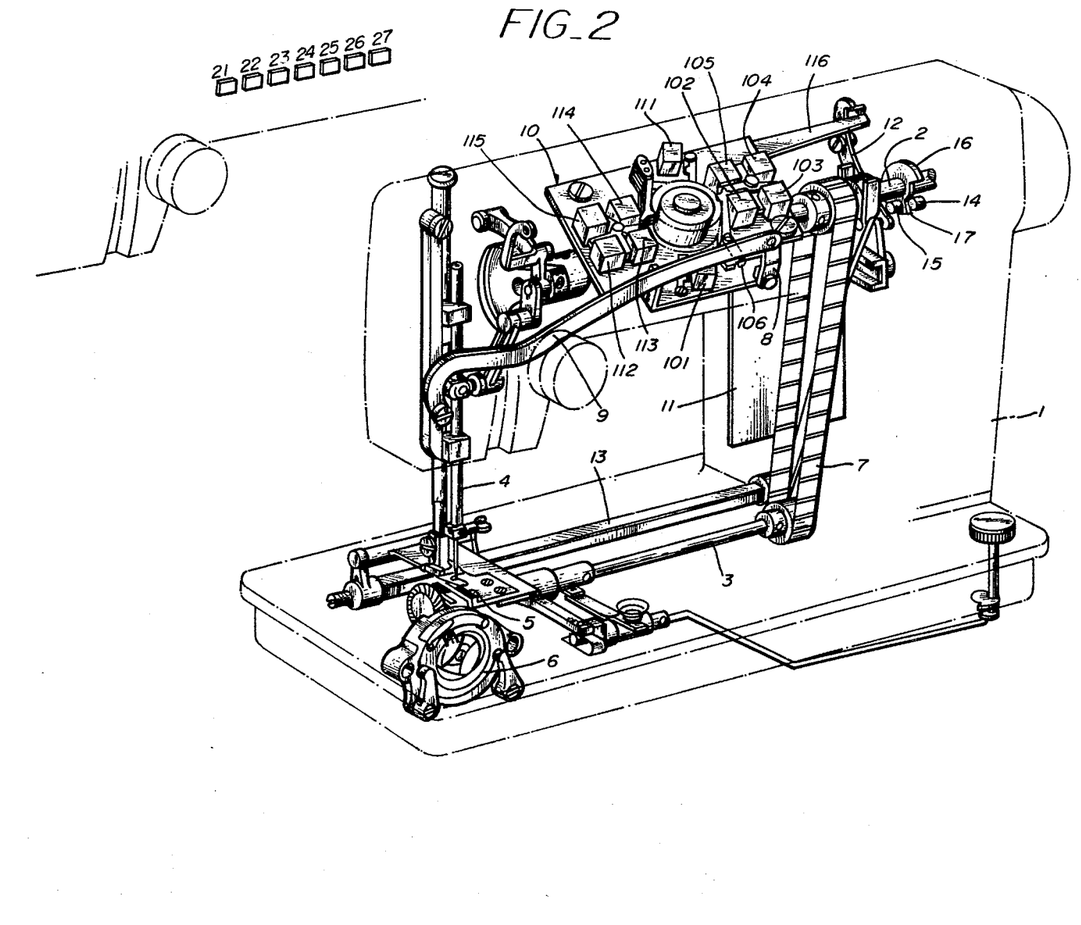
FIG. 2 depicts portions of the mechanical components of one novel sewing machine, in an overall view.

FIG. 2 depicts certain details of the mechanical components of the novel sewing machine. Numeral 1 denotes the frame of the sewing machine. Numeral 2 denotes the upper shaft of the machine. 3 is the lower shaft of the machine. Numeral 4 denotes a needle bar, 5 a cloth feeding device, and 6 a loop taker. When upper shaft 2 is rotated by the prime mover, for example an electric motor, needle bar 4 is reciprocated vertically by means of a crank mechanism and lower shaft 3 is rotated via a timing belt 7 to effect rotation of the loop taker 6.

Numeral 10 denotes generally a pattern forming device operative for driving an output arm 106 to effect oscillation of a control arm 8. The swinging movement of control arm 8 effects lateral reciprocation of a connecting rod 9, connected at one end to control arm 8 and at its other end to the supporting frame of the swingable needle bar. Thus, the needle bar 4 and the needle accommodated therein are caused to swing laterally in direction transverse to the direction of relative movement between the cloth and the cloth feeding device.

The pattern forming device 10 additionally drives a feed control arm 116, causing the latter to effect swinging movement of a regulating arm 12 and thereby impart a feeding movement to the cloth feeding device 5 through the intermediary of a feed control rod 13.

The pattern forming device 10 controls needle position or direction and the amplitude of the cloth feeding movement associated with each stitch under the control of a stitch control signal generated by a control circuit 11 in a manner described below. A phototransistor 14 receives light from a light-emitting diode 15 through a notch 17 in a light shield 16 mounted on the upper shaft 2 of the machine and generates a synchronizing signal synchronized with the rotation of the upper shaft 2.

This synchronizing signal is applied to the control circuit 11.

Pattern selector switches 21-27 are provided on the front side of the frame of the sewing machine, and a desired pattern is selected by activating the corresponding selector switch. The pattern forming device 10 includes an adder (not shown) and driving solenoids 101-105 for controlling the lateral movement of the needle and a further adding device which includes a further adder (not shown) and driving further solenoids 111-115 for controlling the operation of the cloth feeder. These adders are utilized in the imparting of movement to the zig-zag control arm 8 and the feed control arm 12 via the intermediary of the respective output arms 106, 116. The two adder devices respectively control the energization of the driving solenoids 101-105 and 111-115. Depending upon the combination of solenoids which are energized, any of a plurality of displacement distances standing in the ratio of 1 : 2 : 4 : 8 : 16 can be selected and a corresponding movement imparted to a respective one of the output arms 106, 116. Moreover, these component displacement distances can be superimposed in any desired combination, to making for composite displacement distances of anywhere from zero to 31 units.

Figure 3:
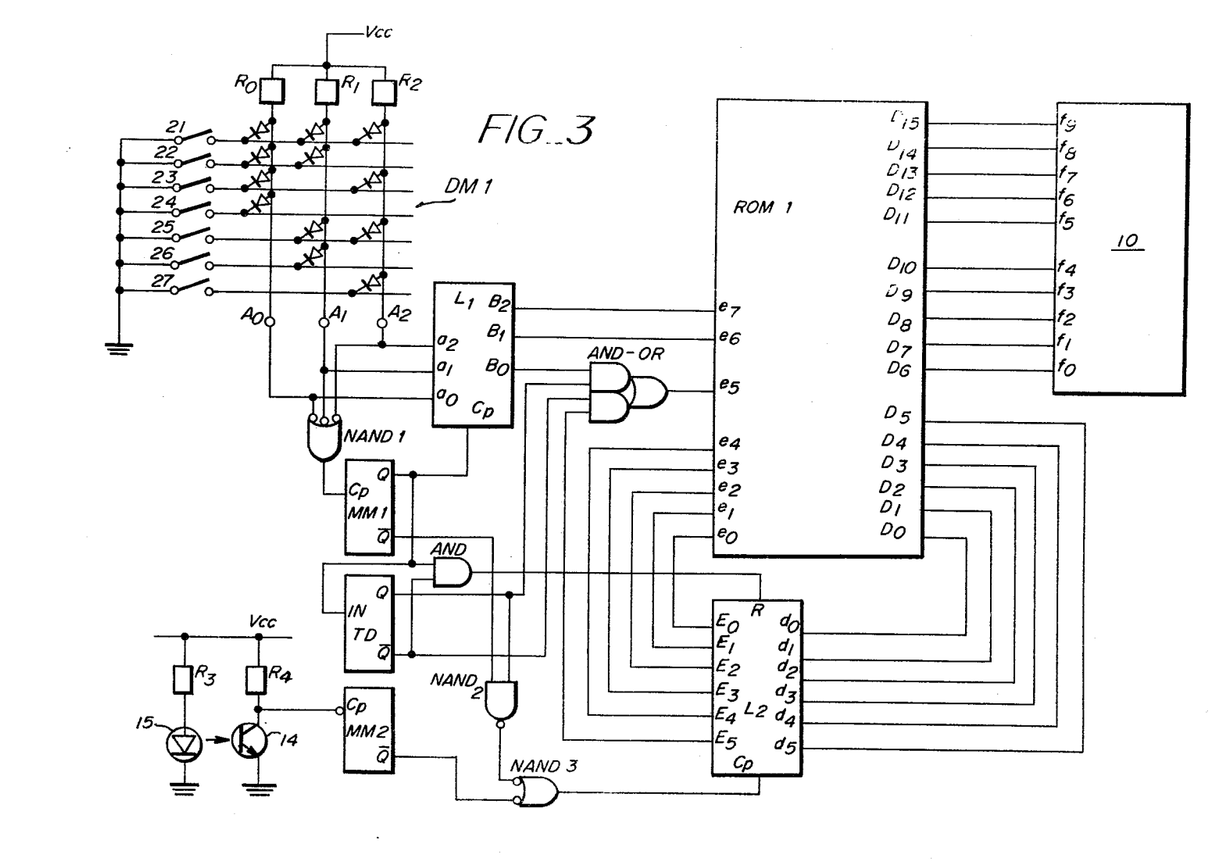
FIG. 3 depicts one exemplary circuit for the pattern selecting and control arrangement.

FIG. 3 is a circuit diagram of one exemplary circuit for supplying stitch control signals to the stitch forming means 10.

$DM_1$ denotes a diode matrix. When any one of the selector switches 21-27 is closed, the diode matrix $DM_1$ applies a binary coded number to the output terminals $A_0$, $A_1$, $A_2$. Seven different binary coded numbers including 000 and excluding 111 are available. Output terminals $A_0$, $A_1$ $A_2$ are connected to the input terminals of a NAND circuit NAND 1 and also to the input terminals $a_0$, $a_1$, $a_2$ of a latch circuit $L_1$. The output terminal of NAND 1 is connected to the trigger terminal $C_p$ of a monostable multivibrator MM 1. Output Q of monostable multivibrator MM 1 is connected to the trigger input $C_p$ of latch circuit $L_1$ and is also connected to the input IN of a time-delay circuit TD, as well as to one of the inputs of an AND circuit AND. The complement output Q of monostable multivibrator MM 1 is connected to one of the inputs of NAND circuit NAND 2. The Q output of time-delay circuit TD is connected to one of the inputs of one of the AND circuits in the AND-OR circuit AND-OR. The other input of that AND circuit is connected to the $B_0$ output of latch circuit $L_1$ and is also connected to the other input of NAND circuit NAND 2. The complement output Q of time-delay circuit TD is connected to one of the inputs of the other AND circuit in circuit AND-OR and the other AND circuit input is connected to output $E_5$ of a further latch circuit $L_2$, and is also connected to the other input of AND circuit AND. The output of AND circuit AND is connected to a reset terminal R of the latch circuit $L_2$.

Phototransistor 14 has its collector connected to the trigger input $C_p$ of a second monostable multivibrator MM 2, and the base of the phototransistor 14 receives light from the LED 15 and applies a synchronizing signal to the trigger input $C_p$ of MM 2 in synchronism with the rotation of the upper shaft 2 of the sewing machine. NAND circuit NAND 3 has its one input terminal connected to the complement output Q of monostable multivibrator MM 2 and has its other input connected to the output of NAND circuit NAND 2, with its output being connected to the trigger input $C_p$ of the latch circuit $L_2$. The latch circuit $L_2$ in FIG. 3 corresponds in function to the timing buffer depicted in FIG. 1 and discussed above. It has input terminals $d_0$-$d_5$ connected to the output terminals $D_0$-$D_5$, respectively, of a static memory ROM 1. Memory output terminals $D_0$-$D_5$ here constitute the next-address signal outputs referred to above in connection with FIG. 1.

When a synchronizing pulse is applied to the trigger input $C_p$ of latch circuit $L_2$, the input $d_0$-$d_5$ become latched to respective ones of the outputs $E_0$-$E_5$ of the latch circuit $L_2$ during the rising flank of the synchronizing pulse. That is, the signals applied to inputs $d_0$-$d_5$ become applied to the outputs $E_0$-$E_5$ and persist there even if the signals at inputs $d_0$-$d_5$ change, as they in fact do. Latch circuit outputs $E_0$-$E_4$ are connected to address signal inputs $e_0$-$e_4$ of the static memory ROM 1, whereas latch circuit output $E_5$ is connected to address signal input $e_5$ of the static memory via the circuit AND-OR. Output terminals $B_1$ and $B_2$ of latch circuit $L_1$ are connected to the address signal inputs $e_6$ and $e_7$ of the static memory ROM 1. The inputs $e_0$-$e_7$ constitute the eight address signal inputs of the static memory ROM 1.

Static memory ROM 1 has three sets of outputs: the next-address signal outputs $D_0$-$D_5$, stitch control signal outputs $D_6$-$D_{10}$ for determining the needle position, and feed control signal outputs $D_{11}$-$D_{15}$ for determining the amount of cloth feed. The stitch control signals are applied to stitch control signal inputs $f_0$-$f_4$ of the pattern forming device 10, whereas the feed control signals are applied to respective ones of the feed control signal inputs $f_5$-$f_9$ of the pattern forming device 10. Although the static memory ROM 1 referred to herein is an IC memory only for reading the memorized signals, other kinds of memories can be used if information can be written into them and read out of them. Vcc denotes the supply voltage, and $R_0$-$R_4$ are conventional biasing resistors.

Figure 4:
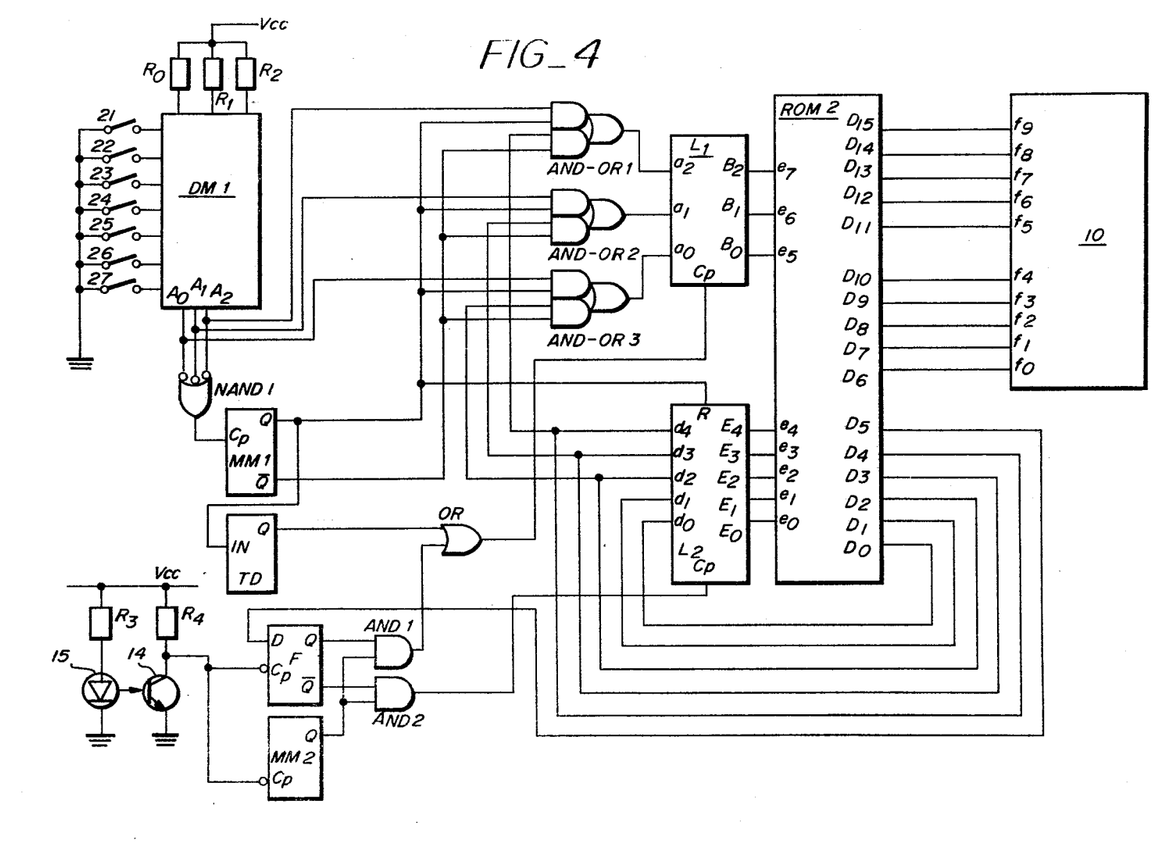
FIG. 4 depicts a second exemplary circuit for the pattern selecting and control arrangement.

FIG. 4 depicts a second exemplary circuit for the pattern control arrangement. For the most part, reference will be made only to those components not corresponding to those of FIG. 3, described already. The inputs $a_0$, $a_1$, $a_2$ of the latch circuit $L_1$ are connected to respective ones of the outputs of AND-OR circuits AND-OR 1, AND-OR 2, AND-OR 3, each of these AND-OR circuits having two pairs of inputs. Two of the inputs of circuit AND-OR 1 are respectively connected to output $A_2$ of diode matrix $DM_1$ and to output Q of monostable multivibrator MM 1; two of the inputs of circuit AND-OR 2 are respectively connected to the diode matrix output $A_1$ and to the Q output of monostable multivibrator MM 1; two of the inputs of circuit AND-OR 3 are respectively connected to the output $A_0$ of diode matrix $DM_1$ and to the Q output of MM 1.

Each of these AND-OR circuits has its other two inputs connected respectively to the complement output Q of MM 1 and to respective ones of the next-address signal outputs $D_4$, $D_3$, $D_2$ of static memory ROM 2. Next-address sinal outputs $D_0$-$D_4$ of the memory ROM 2 are connected to respective ones of the inputs $d_0$-$d_4$ of the latch circuit $L_2$, with the inputs $d_2$, $d_3$ and $d_4$ being directly coupled to inputs of respective ones of the circuits AND-OR 1, AND-OR 2, and AND-OR 3. Next-address signal output $D_5$ of static memory $ROM_2$ serves as a discriminating signal output and is connected to the D input of flip-flop circuit F, which is of the pulse-flank-triggered type. The discriminating signal at discriminating-signal output $D_5$ latches the next-address signals on lines $D_0$–$D_4$ to the outputs of one of the two latch circuits $L_1$, $L_2$, alternatively, with a selection of one of these two latch circuits being made once per rotation of the upper shaft of the sewing machine.

Figure 5:
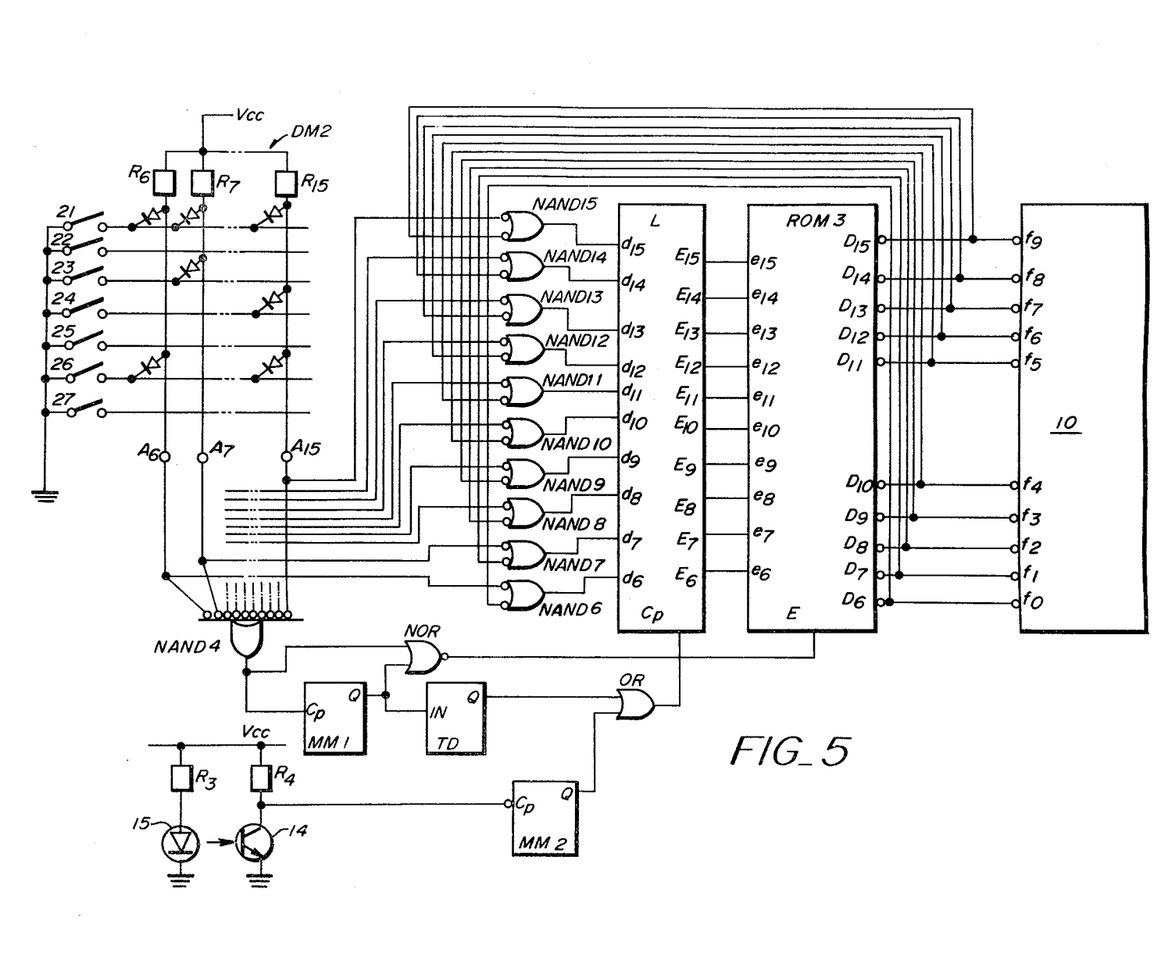
FIG. 5 depicts a third exemplary circuit for the pattern selecting and control arrangement.

FIG. 5 depicts a third embodiment of a circuit for the pattern control arrangement of the novel sewing machine. For the most part, reference will be made only to those components not corresponding to what has already been described with reference to FIGS. 3 and 4.

The diode matrix $DM_2$ has outputs $A_6$–$A_{15}$ connected to respective ones of the ten inputs of NAND circuit NAND 4. Additionally, each of these diode matrix outputs $A_6$–$A_{15}$ is connected to the upper input of a respective one of the NAND circuits NAND 6 and NAND 15. The outputs of these NAND circuits are in turn connected to respective ones of the inputs $d_6$–$d_{15}$ of a latch circuit L. The stitch control signal outputs $D_6$–$D_{15}$ of the static memory ROM 3 are connected to respective ones of the inputs $f_0$–$f_9$ of the pattern forming device 10, and each is additionally connected to the lower input of a respective one of the NAND circuits NAND 6 and NAND 15 in such a manner that the signal values (0 or 1) carried thereon may be inverted.

The output terminals $E_6$–$E_{15}$ of the latch circuit L are connected to respective ones of the address signal inputs $e_6$–$e_{15}$ of the static memory ROM 3. If any one of the pattern selector switches 21–27 is pressed and thereby closed, the signal applied to the output control terminal E of the static memory ROM 3 will cause the latter to furnish 0 signals at all its outputs; if the selector switch is released, static memory ROM 3 will furnish at its outputs signals corresponding to the address signals applied to its address-signal inputs $D_6$–$D_{15}$.

FIG. 6 depicts in tabulated form details of the type of code used for the control signals applied to stitch forming means 10.

The leaf-shaped pattern at the left of FIG. 6 is comprised of 18 stitches, designated $a$ to $r$. Also shown are the first four stitches, designated $a$ to $d$, of the beginning of the next pattern repeat. When the stitch pattern is allowed to repeat, what will be formed is a series of leaf-shaped stitch patterns, for example, constituting an ornamental pattern, attached to each other at the stitches $a$ and $b$. The word "stitch" is being applied to the thread structure formed at the needle penetration points $a$ to $r$, such as at $a$ or $b$, not to the thread segment extending between adjoining needle penetration points, such as the thread segment extending between penetration point $a$ and penetration point $b$. The first needle penetration point id designated $a$, and the last is designated $r$.

The amounts tabulated under "Lateral needle movement" indicate the positions of the needle penetration points $a$ to $r$ on a scale from 0 to 30. Needle penetration point $q$, shown as the rightmost penetration point in the leaf-shaped pattern, is formed with the needle bar in its rightmost or zero position. Needle penetration point $d$, shown as the leftmost penetration point in the leaf-shaped pattern, is formed with the needle bar in its leftmost or "30" position. The first needle penetration point $a$, shown at the bottom of the leaf-shaped pattern, is formed in approximately a middle position, specifically the "11" position of the needle bar.

Each of the numerals from "0" to "31" is encoded as a binary coded five-bit number, as shown in the right-hand one of the two columns under the heading "Lateral needle movement". These 0 and 1 values are applied in the form of 0 and 1 signals to the upper five stitch control signal inputs of the stitch forming means 10.

The amounts tabulated under the heading "Feeding movement" indicate the amount of forward or backward feed which is to occur after the performance of a needle penetration movement and stitch formation. Thus, for example, after the needle penetration movement at $a$, the cloth being sewn is to be fed five units in the forward direction. After the needle penetration movement at $b$, the cloth being sewn is to be fed ten units in the forward direction. After the needle penetratuon movement at $f$, the cloth is to be fed eight units, still in the forward direction. However, after the needle penetration movement at $g$, the cloth is to be fed nine units, now in the backward direction. Then, after the needle penetration movement at $h$, the cloth is again fed nine units in the backward direction. After the needle penetration at $n$, the cloth is fed eight units, but now in the forward direction again.

Each of the numbers from "−15" to "15" including "0" is represented by a corresponding five-bit binary coded number, as indicated in the right-hand column under the heading "Feeding movement" in FIG. 6. When after a needle penetration movement is performed no feeding movement is to occur, this is represented by the number "0". Groups of five signals each in correspondence to the five-bit feed numbers shown in FIG. 6 are applied to the five feed control signal inputs of the pattern forming means 10.

The operation of the embodiment depicted in FIG. 3 will now be explained.

When one of the pattern selector switches 21–27 is briefly closed, one or more of the signals at the output terminals $A_0$, $A_1$, $A_2$ of diode matrix DM 1 becomes 0, as the first step in the signal processing sequence, and the output of NAND circuit NAND 1 becomes 1 and triggers the monostable multivibrator MM 1. The 1 signal at the Q output of monostable multivibrator MM 1 triggers the latch circuit $L_1$, so that the signals being applied to the inputs $a_0$, $a_1$, $a_2$ of the latch circuit $L_1$ from the corresponding outputs of diode matrix DM 1 will become applied to and persist at the outputs $B_0$, $B_1$, $B_2$ of the latch circuit $L_1$. The two pattern selection signals at latch circuit outputs $B_1$ and $B_2$ are applied directly to the address signal inputs $e_6$ and $e_7$ of the memory ROM 1. In contrast, the pattern selection signal at latch circuit output $B_0$ is applied to one input of the AND-OR circuit AND-OR.

The 1 signal at the Q output of monostable multivibrator MM 1 has also triggered the time-delay circuit TD. However, the latter generates a 1 signal at its Q output later than does MM 1. Accordingly, until a 1 signal appears at the Q output of TD, both inputs of AND circuit AND will be in receipt of 1 signals. In other words, when one of the seven pattern selector switches 21–27 is briefly closed, a 1 signal will appear at the output of AND circuit AND, and this 1 signal will persist until a 1 signal appears at the Q output of TD. The 1 signal at the output of AND circuit AND is directly applied to the reset terminal R of the latch circuit $L_2$, causing the latter to become reset; i.e., the signal on each of the six outputs $E_0$–$E_5$ of latch circuit $L_2$ becomes a 0 signal. As a result, 0 signals are applied to each of the address signal inputs $e_0$–$e_4$ of the memory ROM 1, whereas a 0 signal is applied to the address signal input $e_5$ of memory ROM 1 via AND-OR circuit AND-OR.

To summarize the first step in the signal processing sequence: One of the pattern selection switches 21–27 is briefly closed. This causes latch circuit $L_2$ to reset, so that address signal inputs $e_0$–$e_4$ receive 0 signals. Address signal input $e_5$ also receives a 0 signal, but via circuit AND-OR. Address signals $e_6$ and $e_7$ each receive a pattern selection signal (either a 0 signal or a 1 signal), depending upon which of switches 21–27 has been closed.

The second step in the signal processing sequence proceeds as follows:

When after the elapse of its time delay the time-delay circuit TD generates a 1 signal at its Q output, the output signal of AND circuit AND becomes a 0 signal, so that a reset signal (a 1 signal) is no longer applied to the reset input R of latch circuit $L_2$. However, despite the disappearance of the reset signal at reset input R, latch circuit $L_2$ remains in reset condition (each output signal a 0 signal). This is because no 1 signal is yet applied to trigger input $C_p$ of latch circuit $L_2$; specifically, this is because there is a 1 signal at the Q output of the monostable multivibrator MM 2 of the shaft synchronizer and because there is a 1 signal at the output of NAND circuit NAND 2.

When the aforementioned 1 signal appears at the Q output of time-delay circuit TD, it is applied to the lower input of the upper AND circuit of circuit AND-OR. As a result, the pattern selection signal at latch circuit output $B_0$, whether a 0 signal or a 1 signal, becomes applied to address signal input $e_5$. Thus, in step two, the address signal inputs $e_0$–$e_4$ are still in receipt of 0 signals, and the address signal inputs $e_6$ and $e_7$ are still in receipt of two pattern selection signals, but now the address signal input $e_5$ is in receipt of the third pattern selection signal, furnished from latch circuit output $B_0$.

It is to be understood that the five 0 signals at address signal inputs $e_0$–$e_4$, plus the three pattern selection signals at address signal inputs $e_5$–$e_7$, together constitute a eight-bit address signal. The application of this address signal to the address signal inputs of memory ROM 1 causes the corresponding storage units of the memory to be read, so that signals corresponding to the information stored therein will appear at the 16 outputs $D_0$–$D_{15}$ of memory ROM 1. The signals at the stitch control signal outputs $D_6$–$D_{15}$ may well be 0 signals, since these first steps in the signal processing sequence are not intended to result in the formation of stitches but serve only to set up the proper combinations of signals throughout the circuitry. However, the signals produced at next-address signal outputs $D_0$–$D_5$ will designate the next storage unit (composed for example of a plurality of one-bit storage locations) to be read in the next or third step, discussed below. These next-address signals are applied to the inputs $d_0$–$d_5$ of latch circuit $L_2$, but are not transmitted to the outputs $E_0$–$E_5$ thereof because no trigger signal has yet been applied to trigger input $C_p$ of latch circuit $L_2$.

To summarize the second step:

When the time delay set on time-delay circuit TD elapses, the signal at address signal input $e_5$ of memory ROM 1 changes from a 0 signal to a pattern selection signal (which may happen to be a 0 signal). The address signal inputs $e_0$ to $e_4$ continue to be in receipt of 0 signals. The address signal inputs $e_6$ and $e_7$ continue to be in receipt of two of the three pattern selection signals. This combination of address signals produces a group of next-address signals at outputs $D_0$–$D_5$. These are applied to inputs $d_0$–$d_5$ of latch circuit $L_2$ but are not transmitted to the outputs $E_0$–$E_5$ thereof because of the lack of receipt of a trigger signal at trigger input $C_p$.

The third step in the signal processing sequence proceeds as follows:

After the elapse of a predetermined time interval, the monostable multivibrator MM 1 reverts to its stable state. As a result of this, a clock pulse is applied to the trigger input $C_p$ of latch circuit $L_2$ via the NAND circuits NAND 2 and NAND 3, whereupon the next-address signals applied to latch circuit inputs $d_0$–$d_5$ becomes applied to and persist at the latch circuit outputs $E_0$–$E_5$. Thus the next-address signals generated in the second step at the next-address signal outputs $D_0$–$D_4$ of the memory ROM 1 become applied to the actual address signal inputs $e_0$–$e_4$ of the memory.

Of course, the application of these new address signals to the address signal inputs of memory ROM 1 causes new next-address signals to be produced at the next-address signal outputs $D_0$–$D_5$ of the memory. However, these new next-address signals do not become immediately applied to the address signal inputs of the memory; instead, they remain applied to the inputs of the latch circuit $L_2$ (which serves as a timing buffer) until the rotation synchronizer furnishes a clock pulse to the trigger input $C_p$ of the latch circuit $L_2$, which does not occur until in the fourth step, to be described next.

Summarizing what happens in the third step:

Latch circuit $L_2$ receives at its trigger input $C_p$ a clock pulse, resulting not from operation of the rotation synchronizer, but instead from reversion of monostable multivibrator MM 1 to its stable state. The address signal inputs $e_0$–$e_4$, which in step two were all in receipt of 0 signals, now receive as address signals the next-address signals previously generated in step two. The address signal input $e_5$ continues to be in receipt of the pattern selection signal applied to it in step two. The address signal inputs $e_6$ and $e_7$ continue to be in receipt of the pattern selection signals applied to them in step one.

The fourth step in the signal processing sequence proceeds as follows:

The time-delay circuit TD which during the third step was in its unstable state (1 signal at its Q output) now reverts to its stable state (1 signal at its Q output). This enables the lower AND circuit of circuit AND-OR. Accordingly, the hitherto blocked address signal at output $E_5$ of latch circuit $L_2$ becomes applied to address signal input $e_5$. This change in the address signal at address signal input $e_5$ of course constitutes a change in the eight-bit address represented by all the signals on the address signal inputs $e_0$–$e_7$. Thus, a new storage unit within the memory is addressed, and new signals are produced at the memory outputs. In other words, the next-address signals present at the next-address signal outputs $D_0$–$D_5$ during the second step contribute to the determination of what signals will be present at memory outputs $D_0$–$D_{15}$ during the fourth step.

Summarizing what occurs during the fourth step:

The address signal inputs $e_0$–$e_4$, which during the third step were in receipt of the signals generated during the second step at the next-address signal outputs $D_0$–$D_4$, receive now the signals generated at the next-address signal outputs $D_0$–$D_4$ during the third step. The address signal input $e_5$, which during the third step was in receipt of the pattern selection signal applied to it during the second step, now receives the signal generated at the next-address signal output $D_5$ during the third step. The address signal inputs $e_6$ and $e_7$ continue to be in receipt of the pattern selection signals applied to them during the first step.

It will be understood that the course of events in going from the first to the fourth steps occurs very quickly. Accordingly, although stitch control signals may during one or more of the first three steps be applied to the inputs of the pattern forming means 10, they would be applied for time intervals much too short for the electromagnetic moving means of the pattern forming means 10 to react to them.

The signals present at the stitch control signal outputs $D_6$–$D_{15}$ of the memory during the fourth step constitute the first group of stitch control signals for use in controlling the sewing of the first stitch. The signals present at the next-address signal outputs $D_0$–$D_5$ during the fourth step constitute the next-address signals eventually determinative of the second stitch to be sewn.

The fourth step, during which the first stitch of the pattern is sewn, ends when a clock pulse is applied to the trigger input $C_p$ of the latch circuit $L_2$. This occurs when the LED 15 applies light to the phototransistor 14 as the upper shaft of the sewing machine reaches a predetermined angular position. When phototransistor 14 becomes conductive, it triggers monostable multivibrator MM 2, and the latter applies a 0 signal to the lower input of circuit NAND 3, as a result of which a 1 signal is applied to the $C_p$ input of $L_2$.

In this way the next-address signals generated on the next-address signal outputs $D_0$–$D_5$ are successively latched to the outputs of latch circuit $L_2$, with one latching being performed per rotation of the upper shaft of the sewing machine, this determining in a synchronized fashion the stitches to be sewn.

The combination of 0 signals and 1 signals on next-address signal outputs $D_0$–$D_5$ during the second step, and constituting the addresses for the memory during the fourth step, is also utilized for the next-address signals pronounced in conjunction with the last-stitch control signals, so that the selected pattern will be repeatedly sewn.

A characteristic feature of the embodiment of FIG. 3 relates to the manner in which information flows within the circuit. As discussed earlier in the introductory portion of the specification, one of the main advantages of avoiding the use of addressing counters is that the establishment of selectable stitch patterns in the memory can be performed more freely, with respect to the assignment of stitch information to storage units of the memory. Thus, for example, if the selectable patterns initially programmed into the memory are repeatedly replaced by other patterns of one and then a different number of stitches, isolated storage units within the memory may become unused. if subsequently additional storage units are needed for the writing in of information concerning a larger pattern, then with the inventive expedient in question the isolated unused storage units can be utilized, even though they may be located irregularly within the memory.

The embodiment of FIG. 3 exhibits this important advantage, but only to a limited extent. The explanation of this is as follows.

Memory ROM 1 is provided with eight address signal inputs $e_0$–$e_7$. The first five address signal inputs $e_0$–$e_4$ perform in a very straightforward way as address signal inputs during the course of the sewing of a pattern. Somewhat in contrast, the pattern selection signals applied to address signal inputs $e_6$ and $e_7$ do not change during the course of the sewing of a pattern. Thus, while the pattern selection signals present at inputs $e_6$ and $e_7$ in the last analysis serve as address signals, they are fixed for a particular pattern.

It is convenient, for purposes of this explanation, to consider the pattern selection signals at inputs $e_6$ and $e_7$ to be preliminary addressing signals operative for selecting a group of 64 multi-bit storage units from within the memory, and to consider the address signals at inputs $e_0$–$e_5$ to serve for selecting individual storage units from among the preselected 64 storage units.

Such 64 storage units are available for storing information relating to two different selectable patterns. This is because the pair of unchanging signals applied to inputs $e_6$ and $e_7$ is the same for two different selectable patterns; the code signal for one of these two patterns is composed of the signals on inputs $e_6$ and $e_7$ and a 0 signal on input $e_5$, while the code signal for the other of these two patterns is composed of the signals on inputs $e_6$ and $e_7$ and a 1 signal on input $e_5$.

For example, consider the two patterns corresponding to $A_0, A_1, A_2 = 0, 1, 0$ and $A_0, A_1, A_2 = 1, 1, 0$. When the switch associated with the first of these two patterns is closed, a 1 signal is applied to $e_6$ and a 0 signal to $e_7$; likewise, when the switch associated with the other of these two patterns is closed, a 1 signal is applied to $e_6$ and a 0 signal to $e_7$. Thus, regardless of which of these two patterns is selected, the address signals applied to address signal inputs $e_6$ and $e_7$ will be the same, and accordingly will preselect one and the same group of 64 multi-bit storage units for further addressing.

Within the preselected group of 64 multi-bit storage units, some will be reserved for one pattern, others for the other pattern, with the remainder if any being unused. Within this preselected group of 64 storage units, the stitch control information for either pattern can be freely assigned to any available one of the 64 storage units. Thus, the first 32 of the 64 storage units can be used for storing information for the one pattern, and the second 32 of the 64 storage units can be used for storing information for the other pattern. Alternatively, 32 of the storage units, disposed irregularly within the group of 64 storage units, can be used for storing the information relating to one pattern, while the remaining storage units, which accordingly are disposed with similar irregularity, can be used for storing the information relating to the other pattern. Finally, as the most important example, five of the 64 storage units can be used for storing the information relating to one pattern, while the remaining 59 storage units can be used for storing the information relating to the other pattern. The five storage units for the one pattern can be isolated storage units occupying isolated and scattered locations within the preselected group of 64 storage units.

After the preselected 64 storage units have been reprogrammed many times, it may happen that a considerable number of isolated storage units occupying isolated locations within the group of 64 units are not being used for either of the two patterns associated with the group of 64 units. If then it is desired to replace one of the stored patterns with another pattern involving a greater number of stitches, then these isolated unused storage units can be very readily called upon for storage of the stitch information of the new and larger pattern, without in any way disturbing the storage of the stitch information for the one of the two patterns not to be replaced.

It will be appreciated that this considerably increases the flexibility with which the memory ROM 1 can be programmed and the variety of patterns which can be stored, particularly patterns involving few stitches in combination with patterns involving many stitches.

On the other hand, with the expedient of FIG. 3, the freedom with which stitch control information can be assigned to storage units within the memory ROM 1 is still quite limited. While unlimited within the preselected group of 64 multi-bit units associated with a pair of selectable patterns, the assignment of information relating to each one of this pair of patterns is precluded insofar as the many other storage units within the memory are concerned.

More generally stated, the preselected group (here 64 in number) of multi-bit storage units within the memory has associated with it a plurality (here two) of selectable patterns the stitch control information relative to which can be freely assigned within the preselected group.

Another aspect of the circuit of FIG. 3 relates to the number of address signals needed in the course of the sewing of a complete pattern. If the static memory ROM 1 has 256 addresses, corresponding to 256 multi-bit storage units, then it would ordinarily be thought that 8 bits would be necessary for the requisite address signals. In FIG. 3, however, only 6 bits are necessary for the changing address signals, because of the fact that the pattern selection signals at address signal inputs $e_6$ and $e_7$ are unchanging for two different selectable stored patterns.

In the embodiment of FIG. 4, in contrast to that of FIG. 3, there is no limitation at all upon the assignability of the stitch control information relating to any one pattern insofar as all of the storage units within the memory are concerned. For each pattern to be stored, each and every multi-bit storage unit in the memory is potentially available for the storage of stitch control information.

In the embodiment of FIG. 3, there was no limitation upon assignability of stitch control signals relating to the two patterns associated with a preselected group of 64 multi-bit storage units. The only limitation was that the total of the number of stitches in the one pattern and that in the other pattern not exceed 64. In the embodiment of FIG. 4, the only limitation is that the total of the numbers of stitches in all the stored patterns not exceed the total number of multi-bit storage units in the entire memory ROM 2. Thus, for example, with seven selectable patterns being stored, six of the patterns could each consist of a small number of stitches for example five stitches with a total of 30 storage units being needed for these six patterns, and all the remaining storage units in the memory could be used for the storage of stitch control signals relating to a pattern involving a considerably larger number of stitches.

The circuit of FIG. 4 operates in the following manner:

The outputs $D_0$–$D_5$ of static memory ROM 2 are next-address signal outputs. Output $D_5$ furnishes a discriminating signal. The value (0 or 1) of the discriminating signal effects a selection of either the address signal inputs $e_0$–$e_4$ or else the address signal inputs $e_5$–$e_7$ in a manner explained more fully below. When any one of the pattern selector switches 21-27 is closed, the monostable multivibrator circuit MM 1 is triggered, as was the case in the first step in FIG. 3, and the encoded output signals on outputs $A_0$, $A_1$, $A_2$ of diode matrix DM 1 are furnished to the input terminals $a_0$, $a_1$, $a_2$ of the latch circuit $L_1$ through the intermediary of the AND-OR circuits AND-OR 1, AND-OR 2, AND-OR 3.

Also, the triggering of MM 1 causes a reset signal to be applied to latch circuit $L_2$, so that 0 signals are applied to all the address signal inputs $e_0$–$e_4$ of the static memory ROM 2.

Summarizing the first step:

One of the seven pattern selector switches 21-27 is closed. This triggers MM 1, so that the pattern selection signals on outputs $A_0$, $A_1$, $A_2$ become applied to the latch circuit inputs $a_0$, $a_1$, $a_2$. Also, latch circuit $L_2$ becomes reset, so that 0 signals become applied to address signal inputs $e_0$–$e_4$. Address signal inputs $e_5$–$e_7$ are likewise in receipt of 0 signals.

The second step in the signal processing sequence proceeds as follows:

The 1 signal appearing at the Q output of triggered monostable circuit MM 1 is applied to the input of time-delay circuit TD and appears at its Q output after the elapse of a predetermined time delay. The signal at the Q output of TD triggers the latch circuit $L_1$ via OR circuit OR, and latches the signals from the outputs of diode matrix DM 1 to the latch circuit outputs $B_0$, $B_1$, $B_2$ and thereby to the address signal inputs $e_5$, $e_6$, $e_7$ of static memory ROM 2. After the elapse of a certain amount of time, monostable circuit MM 1 reverts to its stable state and the 1 signal at the Q output of circuit TD disappears; although this terminates the pattern selection operation, the combination of signals (0 or 1) on address signal inputs $e_5$–$e_7$ does not change.

The signals on memory outputs $D_6$–$D_{15}$ determined by the signals on address signal inputs $e_0$–$e_7$ are the initial stitch control signals, whereas the signals on outputs $D_0$–$D_4$ are the next address signals for use in designating the address for the second stitch. The signal on next-address signal output $D_5$ is the discriminating signal which determines the destinations for the next-address signals on next-address signal outputs $D_0$–$D_4$.

The lower inputs of AND circuits AND 1 and AND 2 normally are in receipt of 0 signals, but receive 1 signals when phototransistor 14 is rendered conductive. The rendering conductive of phototransistor 14 also triggers flip-flop circuit F, and when the circuit F receives at its D input a 1 signal from discriminating-signal output $D_5$, it generates a 1 signal at its Q output and triggers latch-circuit $L_1$ via AND circuit AND 1 and OR circuit OR 1, latching the signals on next-address signal outputs $D_2$–$D_4$ for the second stitch so that such signals become applied to address signal inputs $e_5$–$e_7$ of the static memory ROM 2.

Likewise, when flip-flop circuit F receives at its D input a 0 signal from the discriminating-signal output $D_5$, it furnishes a 1 signal at its Q output and triggers latch circuit $L_2$ via AND circuit AND 2, latching the signals on next-address signal outputs $D_0$–$D_4$ for the second stitch, so that these become applied to address signal inputs $e_0$–$e_4$ of the static memory ROM 2. These operations are repeated, once per rotation of the upper shaft of the sewing machine, to form the stitch patterns. Thus, the static memory ROM 2 itself produces next-address signals for application to its own address signal inputs $e_0$–$e_7$ utilizing the five signals on its next-address signal outputs $D_0$–$D_4$.

The use of the signal on next-address signal output $D_5$ as a discriminating signal makes possible the control of the application of address signals to the eight inputs $e_0$–$e_7$ using only the six signals on next-address signal outputs $D_0$–$D_5$.

Likewise, the free assignability of stitch information to the multi-bit storage units of the memory ROM 2 inherent in the circuit of FIG. 4 is to be noted. In FIG. 4, the address signals applied to address signal inputs $e_5$–$e_7$ are, alternatively, those supplied from the outputs $A_0$, $A_1$, $A_2$ of diode matrix DM 1 or else next-address signals from memory outputs $D_2$, $D_3$, $D_4$ when the discriminating signal on output $D_5$ routes those three signals to the address signal inputs $e_5$–$e_7$. Thus, the freedom of assignability of information to the different multi-bit storage units is greater than in FIG. 3. In FIG. 3, the address signals at address signal inputs $e_6$ and $e_7$ did not change during the entire course of the sewing of one pattern. In FIG. 4, in contrast, depending upon the value of the discriminating signal on line $D_5$, address signal inputs $e_5$–$e_7$ can receive address signals other than the pattern selection signals of matrix DM 1. Moreover, since these alternative address signals can include any combination of values, there is in principle no multi-bit storage unit within the memory to which the information relating to particular selectable pattern cannot be assigned. In other words, given a plurality of patterns, the stitch control information for each of the patterns can be assigned to any multi-bit storage unit in the memory. There is no limitation whatsoever on the freedom of assignability of stitch control information to the storage units.

The embodiment of FIG. 5 differs from those of FIGS. 3 and 4 in that the static memory ROM 3 has only ten outputs $D_6$–$D_{15}$, i.e., only as many outputs as are needed for the ten stitch control signals to be applied to the pattern forming device 10. No separate outputs for generation of next-address signals are provided. Instead, the ten stitch control signals are themselves used as the next-address signals.

The embodiment of FIG. 5 operates as follows:

When any one of the seven pattern selector switches 21–27 is closed, a ten-bit coded signal appears on the outputs $A_6$–$A_{15}$ of diode matrix DM 2. The ten-bit numbers preselected to correspond to respective ones of the seven selector switches 21–27 are selected so that each includes at least one 0. As a result, when any one of switches 21–27 is closed, at least one 0 signal will be applied to NAND circuit NAND 4, as a result of which a 1 signal will appear at the output of NAND 4. The ten signals on diode matrix outputs $A_6$–$A_{15}$ also serve as the first set of address signals for identifying the 10 multi-bit storage units within memory ROM 3 which are to be read for producing at memory outputs $D_6$–$D_{15}$ the first set of 10 stitch control signals for the control of the formation of the first stitch in the pattern.

The aforementioned 1 signal which appears at the output of NAND 4 when any one of switches 21–27 is closed is applied to NOR circuit NOR, causing a 0 signal to appear at the output of the latter and become applied to the output control terminal E of static memory ROM 3. As a result, 0 signals appear on all the ten memory outputs $D_6$–$D_{15}$. Each of these 10 0 signals is inverted to produce a respective 1 signal, and each of these 10 1 signals is applied to the lower input of a respective one of the ten NAND circuits NAND 6 to NAND 15. As a result, these ten NAND circuits become enabled for transmission of the complements of the ten diode matrix output signals on lines $A_6$–$A_{15}$. Thus, the complement of each of the ten signals on lines $A_6$–$A_{15}$ becomes applied to a respective one of the ten inputs $d_6$–$d_{15}$ of the latch circuit L.

Meanwhile, the aforementioned 1 signal which appears at the output of NAND 4 in response to closing of one of the switches 21–27 has triggered monostable multivibrator MM 1. The 1 signal appearing at the Q output of MM 1 is applied to input IN of time-delay circuit TD. After the elapse of a predetermined time delay, a 1 signal appears at the Q output of TD. This latter 1 signal is applied via circuit OR to the control input $C_p$ of latch circuit L. The rising flank of this one signal triggers the latch circuit L. As a result, the address signals being applied to latch circuit inputs $d_6$–$d_{15}$ become latched to outputs $E_6$–$E_{15}$ and accordingly to address signal inputs $e_6$–$e_{15}$. At this instant, and for so long as the pushbutton associated with the closed one of switches 21–27 is kept depressed, and also for the duration of the unstable state of monostable multivibrator MM 1, the signals at the memory outputs $D_6$–$D_{15}$ are all 0.

If the closed one of switches 21–27 is now opened, then after the elapse of a certain time interval, a 1 signal appears on each of the ten diode matrix outputs $A_6$–$A_{15}$. Thus 10 1 signals are applied to the 10 inputs of circuit NAND 4 which accordingly generates a 0 signal at its output. This 0 signal is applied to the upper input of circuit NOR. Accordingly, a 1 signal appears at the output of NOR. This 1 signal is applied to the output control terminal E of memory ROM 3.

As a result, the 10 signals on memory outputs $D_6$–$D_{15}$ become applied, after inversion, to the NAND circuits NAND 6 to NAND 15; they also become applied, after inversion and subsequent reinversion, to the control signal inputs $f_0$–$f_9$ of pattern forming device 10. The application of the inverted stitch control signals to the circuits NAND 6 to NAND 15 causes the stitch control signals, in reinverted form, to become applied to the latch circuit inputs $d_6$–$d_{15}$.

During sewing of the pattern, synchronizing signals as before are applied via phototransistor 14, monostable multivibrator MM 2 and OR circuit OR to the trigger input $C_p$ of latch circuit L. Accordingly, the stitch control signals appearing at the memory outputs $D_6$–$D_{15}$ are utilized as next-address signals and are applied, in synchronism with sewing machine operation, to the address signal inputs $e_6$–$e_{15}$ each time that latch circuit L is latched. The stitch control signals at memory outputs $D_6$–$D_{15}$ for each stitch determine the addresses of the multi-bit storage units within memory ROM 3 which are to be read for producing the 10 stitch control signals at outputs $D_6$–$D_{15}$ for the next stitch.

With the control circuit of FIG. 5, so long as the output signals of static memory ROM 3 are all 0 signals — i.e., so long as one of the pushbuttons associated with one of the pattern selector switches 21–27 is kept depressed and accordingly the corresponding switch kept closed — the pattern-forming device will sew uniform stitches in a straight line. However, when the depressed pushbutton is released, and accordingly the corresponding pattern selector switch opened, the respective programmed pattern will be automatically sewn. If it is desired to have, for example, sections of uniform stitches sewn in a straight line alternating with for example the leaf-shaped stitch pattern of FIG. 6, then it is merely necessary to alternately depress and release the one of selector switches 21–27 corresponding to the desired pattern.

It will be understood that each of the elements described above, or two or more together, may also find a useful application in other types of circuits and constructions differing from the types described above.

While the invention has been illustrated and described as embodied in the combination of control arrangements and a particular type of sewing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;

1. In a sewing machine, an arrangement for forming patterns made up of stitches, comprising, in combination, a static memory having a plurality of outputs and a plurality of address signal inputs and comprised of a plurality of storage units connected to said inputs and outputs and addressable by address signals applied to the address signal inputs of the memory; stitch-forming means provided with a plurality of stitch control signal inputs connected to outputs of the static memory and operative for producing any of a plurality of different stitches in dependence upon the signals produced at the outputs of the static memory; addressing means operative when activated for applying to the address signal inputs of the static memory next-address signals derived from the signals produced at the outputs of the static memory; and synchronizing means operative for activating the addressing means in synchronism with the operation of the stitch-forming means.

2. The sewing machine defined in claim 1, the static memory having a plurality of stitch control signal outputs and a plurality of next-address signal outputs, the stitch control signal outputs being connected to the stitch control signal inputs of the stitch-forming means, the addressing means including a buffer circuit connecting the next-address signal outputs of the memory to the address signal inputs of the static memory, the buffer circuit being operative when activated for applying the next-address signals at the next-address signal outputs of the static memory to the address signal inputs of the static memory.

3. The sewing machine defined in claim 1, the static memory having a plurality of stitch control signal outputs connected to the stitch control signal inputs of the stitch-forming means, the addressing means comprising means operative when activated for applying to the address signal inputs of the static memory next-address signals derived from the stitch control signals at the stitch control signal outputs of the static memory.

4. The sewing machine defined in claim 1, the pattern-forming arrangement further including pattern selector means operative for selecting any of a plurality of different patterns stored in the static memory by applying to the address signal inputs of the static memory a first group of address signals causing the addressing means to derive from the signals produced at the output of the static memory the first group of next-address signals.

5. The sewing machine defined in claim 2, the pattern-forming arrangement further including pattern selector means operative for selecting any of a plurality of different patterns stored in the static memory by applying to the address signal inputs of the static memory a first group of address signals causing the appearance at the stitch control signal outputs of the static memory of the first group of stitch control signals and causing the appearance at the next-address signal outputs of the static memory of the first group of next-address signals.

6. The sewing machine defined in claim 1, the pattern-forming arrangement further including a plurality of pattern selectors each settable by the user of the machine to assume either a first activation state or a second activation state, means operative when any one of the selectors is in the first activation state for applying to the address signal inputs address signals causing the stitch-forming means to sew a common pattern irrespective of which one of the selectors is in the first activation state, and operative when any one of the selectors is in the second activation state for applying to the address signal inputs a respective first group of address signals causing the addressing means to derive from the signals produced at the output of the static memory the first group of next-address signals for a respective one of the patterns stored in the static memory.

7. The sewing machine defined in claim 6, wherein each pattern selector is a switch having an opened setting and a closed setting, one of these two settings corresponding to the first activation state of the pattern selector.

8. The sewing machine defined in claim 6, wherein each pattern selector is a switch having an opened setting and a closed setting, assumption of the second activation state by each switch being constituted by assumption by the switch of one and then the other of the two settings.

9. The sewing machine defined in claim 6, wherein repeatedly changing the state of activation of any of the selectors causes the stitch-forming means to alternately sew the common pattern and the respective one of the patterns stored in the static memory.

10. The sewing machine defined in claim 1, the address signal inputs of the static memory comprising a first, a second and a third set of address signal inputs, each set of address signal inputs consisting of at least one address signal input, the pattern-forming arrangement further including pattern selector means operative for selecting any one of a plurality of different patterns stored in the static memory by applying to the first and second sets of address signal inputs a set of pattern selection signals constituting first address signals causing first next-address signals to be derived from the output signals of the static memory, and by thereafter applying the first next-address signals to the second and third sets of address signal inputs while maintaining the first set of address signals in receipt of the respective pattern selection signals.

11. The sewing machine defined in claim 2, the addressing means including means for automatically changing the routing of the next-address signals to the address signal inputs of the static memory in dependence upon the value of the signals appearing on at least one of the next-address signal outputs of the static memory.

* * * * *